United States Patent [19]

Mori

[11] Patent Number: 4,479,125

[45] Date of Patent: Oct. 23, 1984

[54] RADIO PAGING RECEIVER CAPABLE OF MUTING BATTERY SAVING FUNCTION

[75] Inventor: Toshihiro Mori, Tokyo, Japan

[73] Assignee: Nippon Electric Co., Ltd., Tokyo, Japan

[21] Appl. No.: 393,925

[22] Filed: Jun. 30, 1982

[30] Foreign Application Priority Data

Jul. 14, 1981 [JP] Japan .................................. 56-109776

[51] Int. Cl.³ .............................................. H04B 1/16
[52] U.S. Cl. ................................ 340/825.44; 455/226; 455/228; 455/343
[58] Field of Search .................... 455/67, 226, 228, 343, 455/38, 227; 340/825.44, 825.48, 311.1

[56] References Cited

U.S. PATENT DOCUMENTS

| 3,783,384 | 1/1974 | Wycoff | 340/825.48 |
| 4,194,153 | 3/1980 | Masaki et al. | 455/343 |
| 4,353,065 | 10/1982 | Mori | 455/38 |
| 4,377,003 | 3/1983 | Abe et al. | 455/226 |

FOREIGN PATENT DOCUMENTS

75809  7/1978  Japan .............................. 340/825.44

Primary Examiner—Jin F. Ng
Attorney, Agent, or Firm—Sughrue, Mion, Zinn, Macpeak, and Seas

[57] ABSTRACT

An electronic detection circuit recognizes a test signal and causes the battery saving feature in a paging receiver to be suspended for a testing period. During testing and receiving periods, battery power is continuously supplied to a receiving circuit. At other times, power is intermittently supplied to the receiving circuit in a prescribed cycle.

9 Claims, 20 Drawing Figures

RADIO PAGING RECEIVER CAPABLE OF MUTING BATTERY SAVING FUNCTION

BACKGROUND OF THE INVENTION

The present invention relates to a paging receiver, and more particularly to a radio paging receiver having a battery saving function.

A conventional radio paging receiver generally includes a battery saving circuit to save battery power, as disclosed in the U.S. Pat. No. 4,194,153 "Digital Radio Paging Communication System", granted to M. Masaki et al. on Mar. 18, 1980. The battery saving circuit supplies power intermittently to the receiver during the absence of paging signals while supplying the same continuously in response to the reception of the paging signals. However, while such an intermittent supply of power is effective for power saving, it inconveniences the testing or adjustment to which each receiver is subjected before being marketed.

A method for placing the receiver in condition for test operation has been proposed in the pending U.S. patent application by H. Abe et al. entitled "Portable Radio Communication Device Structure", Ser. No. 159,154, filed on June 30, 1980 now U.S. Pat. No. 4,377,003 issued Mar. 15, 1983. This method comprises mounting a strapping connector with a magnet on top of a battery thereby to mute the battery saving circuit. This permits the receiver to be placed in condition for test operation even when placed outside its case. However, the strapping connector tends to be easily lost by mistake.

SUMMARY OF THE INVENTION

Therefore, an object of the present invention is to provide a radio paging receiver capable of muting its battery saving operation without resorting to any external manipulation such as strapping.

Another object of the present invention is to provide a radio paging receiver capable of suspending its battery saving function after receiving a specified tone- or digital-pattern for testing.

Still another object of the present invention is to provide a radio paging receiver having a single-chip central processing unit (CPU), capable of suspending its battery saving operation after receiving a specified digital-pattern signal for test.

According to the invention, there is provided a radio paging receiver comprising battery saving means for intermittently supplying power to some or all of its circuits at least while signals addressed thereto are being received; detecting means for detecting a specified tone- or digital-pattern for testing received signals; and means for continuously supplying power to some or all of its circuits by suspending the operation of the battery saving means in response to the output of the detecting means, thereby placing the receiver in condition for a test operation.

BRIEF DESCRIPTION OF THE DRAWINGS

Other objects, features and advantages of the present invention will become more apparent from the detailed description hereunder taken in conjunction with the accompanying drawings, wherein.

DESCRIPTION OF THE PREFERRED EMBODIMENTS

Figure 1:
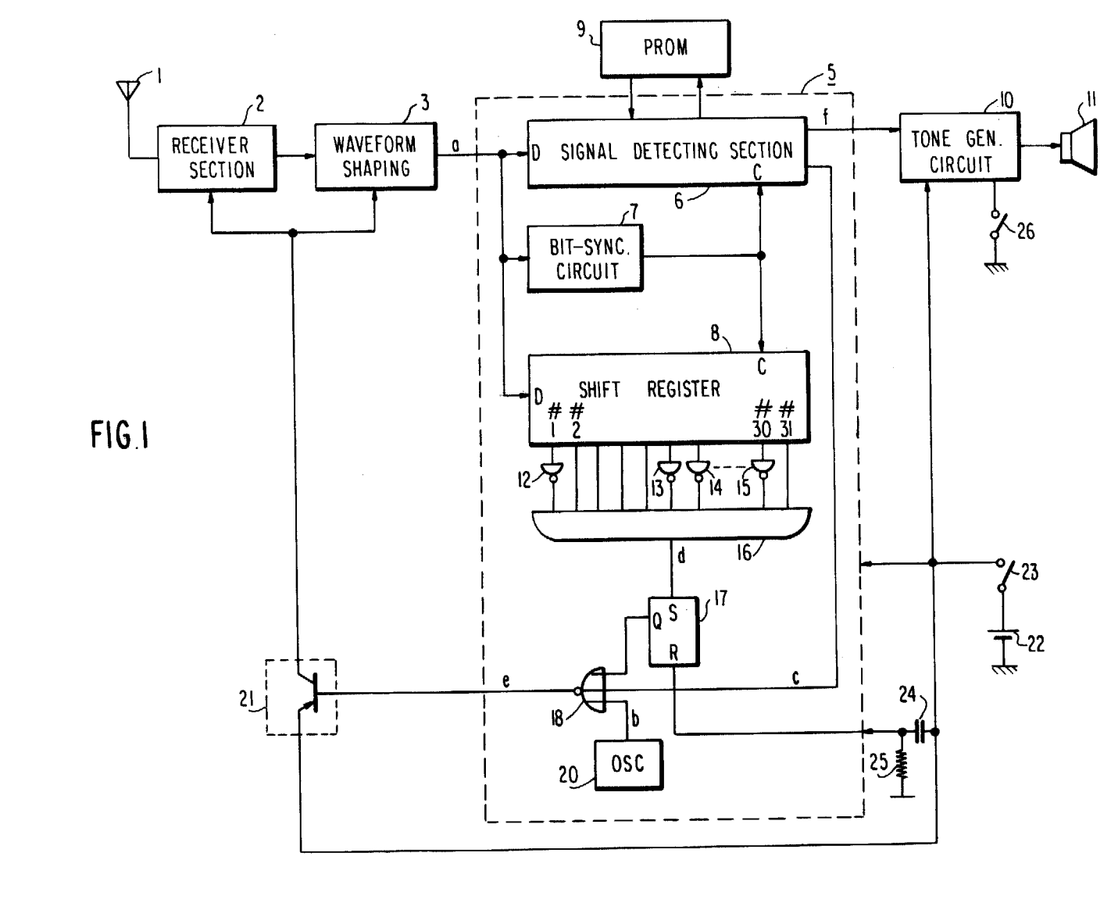
FIG. 1 is a schematic block diagram of a radio paging receiver according to the present invention.

Referring to FIG. 1, an antenna 1 is connected to a receiver section 2, signals from which are led to a waveform shaping circuit 3. The waveform shaping circuit 3 supplies the waveform-shaped output to signal detecting section 6, a bit synchronizing circuit 7 and a 31-bit shift register 8, all in a decoder 5.

The signal detecting section 6 is connected to a programmable read only memory (PROM) 9 and supplies its output to an alert tone generating circuit 10, which, with its output, drives a speaker 11. The bit synchronizing circuit 7 supplies its output to the clock terminals of the signal detecting section 6 and the shift register 8 for their bit synchronization. The outputs #1 to #31 of the shift register 8 are supplied to the input terminals of an AND gate 16 either through inverters 12 to 15 or directly.

The output of the AND gate 16 is led to the set terminal of a flipflop 17 whose Q terminal output is led to one of the input terminals of a NOR gate 18. To the other input terminals of the NOR gate 18 are supplied the outputs of the signal detecting section 6 and an oscillation circuit 20. The output of the NOR gate 18 is led to the base terminal of a switching transistor 21 to control its switching. The switching transistor 21 receives power supply at its emitter from a battery 22 through a switch 23, and to its collector are connected the receiver section 2 and the waveform shaping circuit 3. That is, whether or not the power is supplied depends on the switching control of the transistor 21. The battery 22 also supplies power to the detector 5 and the alert tone generating circuit 10 through the switch 23, and to the reset terminal of the flipflop 17 by way of the switch 23 and a differentiating circuit consisting of a capacitor 24 and a resistor 25.

Figure 2A:
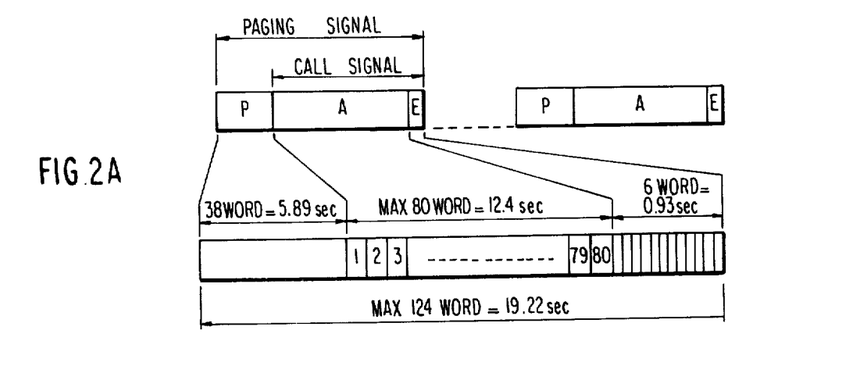
FIGS. 2A to 2E show the signal formats for use in a radio paging receiver according to the present invention.

Referring now to FIG. 2A, a paging signal includes a preamble signal P, and a call signal including an address signal A and an end-mark signal E. In this particular example, the preamble signal P comprises 38 words (5.89 sec); the address signal A, a maximum of 80 words (12.4 sec); and the end-mark signal E, 6 words (0.93 sec).

Figure 2B:
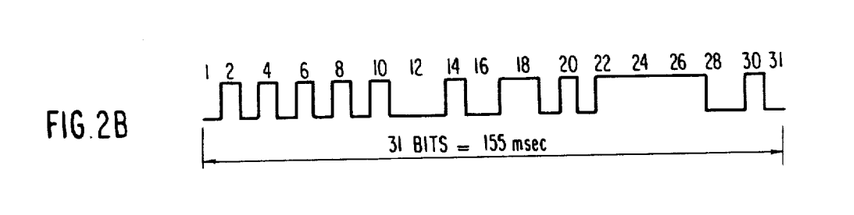
Figure 2C:
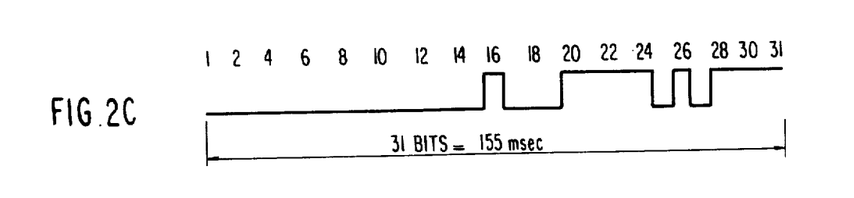
Figure 2D:
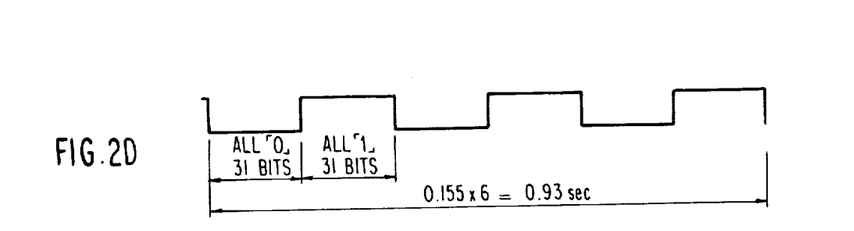
Figure 2E:
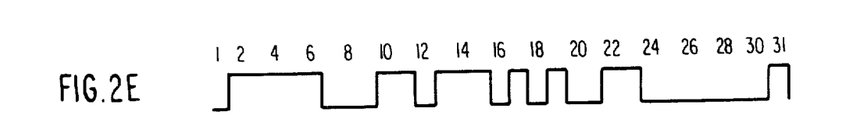

In FIG. 2B, for each of the unique words constituting the preamble signal P are assigned 31 bits of 155 msec. The preamble signal P is intended for temporarily suspending the battery saving operation so that the signals following the preamble signal can be received. In FIG. 2C, for each of the address words constituting the address signal A are also assigned 31 bits of 155 msec. In FIG. 2D, for each word of the end-mark signal E are assigned 31 bits of 155 msec. and the end-mark signal E itself is made up of the repetition of alternating all "0" and all "1" words. The specified digital-pattern signal for test, which is a feature of the present invention, has 31 bits per word, as shown in FIG. 2E. As will be described in detail below, the receiver will suspend or mute its battery saving function upon receipt of this specified digital-pattern signal, thereby placing the receiver in condition for test operation. In such test operation condition, the receiver can be tested and readjusted.

Figure 3A:
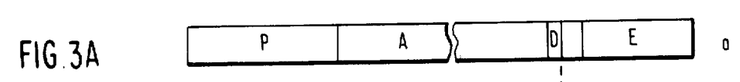
FIGS. 3A to 3F and 4A to 4F are operational time charts showing waveforms at various points within the receiver illustrated in FIG. 1.
Figure 3B:
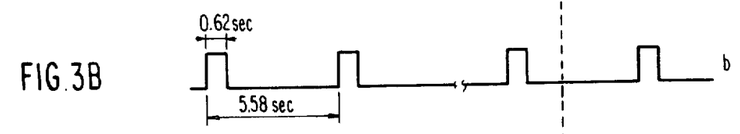
Figure 3C:
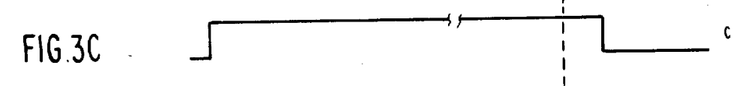
Figure 3D:
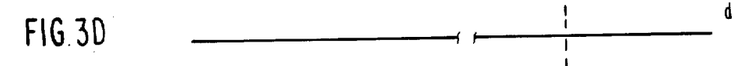
Figure 3E:
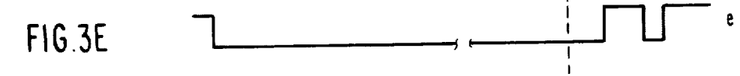

FIGS. 3A to 3F are time charts showing waveforms at various points of FIG. 1 when the receiver is in a normal receiving operation. Referring to FIGS. 1 and 3A to 3F, the antenna 1 receives a carrier wave modulated with a paging signal having the format of FIG. 3A and supplies the carrier to the receiver section 2, which demodulates it to provide a demodulated paging signal. The demodulated signal is supplied via the waveform shaping circuit 3 to the signal detecting section 6, the bit synchronizing circuit 7 and the 31-bit shift register 8, all in the decoder 5. During the normal operation of the receiver, the decoder 5 intermittently supplies power to both the receiver section 2 and the waveform shaping circuit 3 by controlling the switching transistor 21. The switching transistor is turned on by a signal provided from the oscillation circuit 20 via the NOR gate 18 in the cycle shown in FIG. 2B. If the preamble signal P is detected while power is supplied, the decoder 5 will continue to supply power to the receiver section 2 and the waveform shaping circuit 3 through the NOR gate 18 for a duration needed for the detection of the following call signal (usually about 20 sec), irrespective of the cycle of FIG. 3B, as shown in FIG. 3C, thereby enabling the reception of the address signal A coming in next.

Figure 3F:
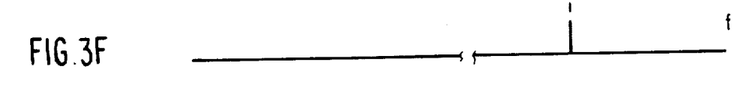

In this paging receiver, the source of clock pulses needed for processing digital signals at the decoder 5 consists of the bit synchronizing circuit 7 adapted to receive signals from the waveform shaping circuit 3. The preamble signal P serves as the frame synchronization signal of the address signal A. When receiving the call signal, the decoder 5 sequentially reads out the contents of the PROM 9 in which the paging number of the receiver is written. The signal detecting section 6 compares the demodulated call signal (FIG. 3A) with the read-out contents and, upon detection of coincidence, provides a pulse as shown in FIG. 3F representing the detection of a desired signal D. The pulse so generated actuates the alert tone generating circuit 10. The speaker 11 is thereby sounded to let the holder of the receiver know that a desired signal has been received. Then, the receiver under power supply again shifts to the battery saving operation upon detection of the end-mark signal E, as shown in FIG. 3C.

FIGS. 4A to 4F are time charts showing waveforms at the points of FIG. 1, like FIGS. 3A to 3F, but these charts in particular refer to the reception of the specified digital-pattern signal for test shown in FIG. 2E. The specified digital-pattern signal may be given from a code generator which is also able to generate codes for the preamble, address and end-mark signals. Reception of this specified digital-pattern signal results in suspension of the battery saving function to permit, for instance, the readjustment of the high frequency section or the measurement of the local oscillation frequency by temperature test or otherwise. The receiver intermittently receives signals in the cycle of FIG. 4B and, upon receipt of the preamble signal P of FIG. 4A, suspends the battery saving function for a long enough period to receive the ensuing call signals. The address number of the received call signal is compared with an identification number assigned to the receiver and stored in the PROM 9.

Figure 4A:
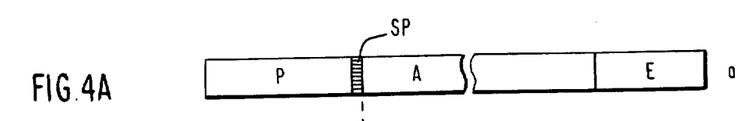
Figure 4B:
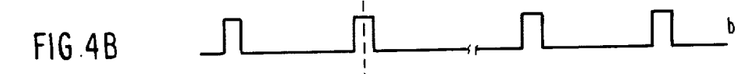
Figure 4C:
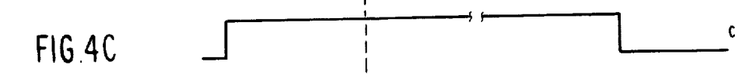
Figure 4D:
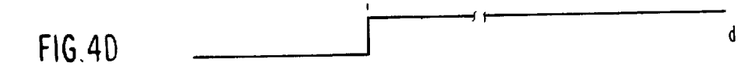
Figure 4E:
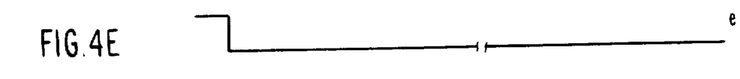
Figure 4F:
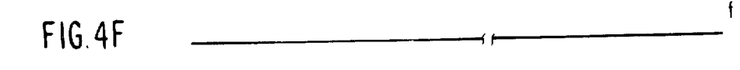

At the same time, the specified digital-pattern signal SP of FIG. 4A is monitored by the shift register 8, the inverters 12 to 15 and the AND gate 16. If the specified signal is detected, the flipflop 17 is set and, irrespective of the control signals shown in FIGS. 4B and 4C, the output of the flip-flop 17 shown in FIG. 4D causes power from the battery 22 to be indefinitely supplied through the NOR gate 18 and the switching transistor 21 to the receiver section 2 and the waveform shaping circuit 3, as shown in FIG. 4D. This power supply enables the pertinent parts of the receiver to be subjected to readjustment, measurement or the like. Incidentally, return to the battery saving operation may be achieved by the presetting of the switch 23.

If there is provided a timer having a prescribed length of time in which to respond to the output of the flipflop 17 and its output is connected to the reset terminal of the flipflop 17, the battery saving function can be automatically restored after the prescribed length of time. The oscillation circuit 20 can be composed of an astable multivibrator using a transistor or an RC oscillation circuit. The switching transistor 21 may be a bipolar type transistor, an FET, an SCR or the like. Further, the PROM 9 can consist of a diode matrix or a transistor matrix, such as $\mu$PB-487R manufactured and marketed by Nippon Electric Co., Ltd. The decoder 5 may be a low voltage single-chip CPU (for instance, $\mu$PD 7502G manufactured and marketed by NEC). The operation of a receiver wherein this single-chip CPU is used will be described hereinafter.

Figure 5:
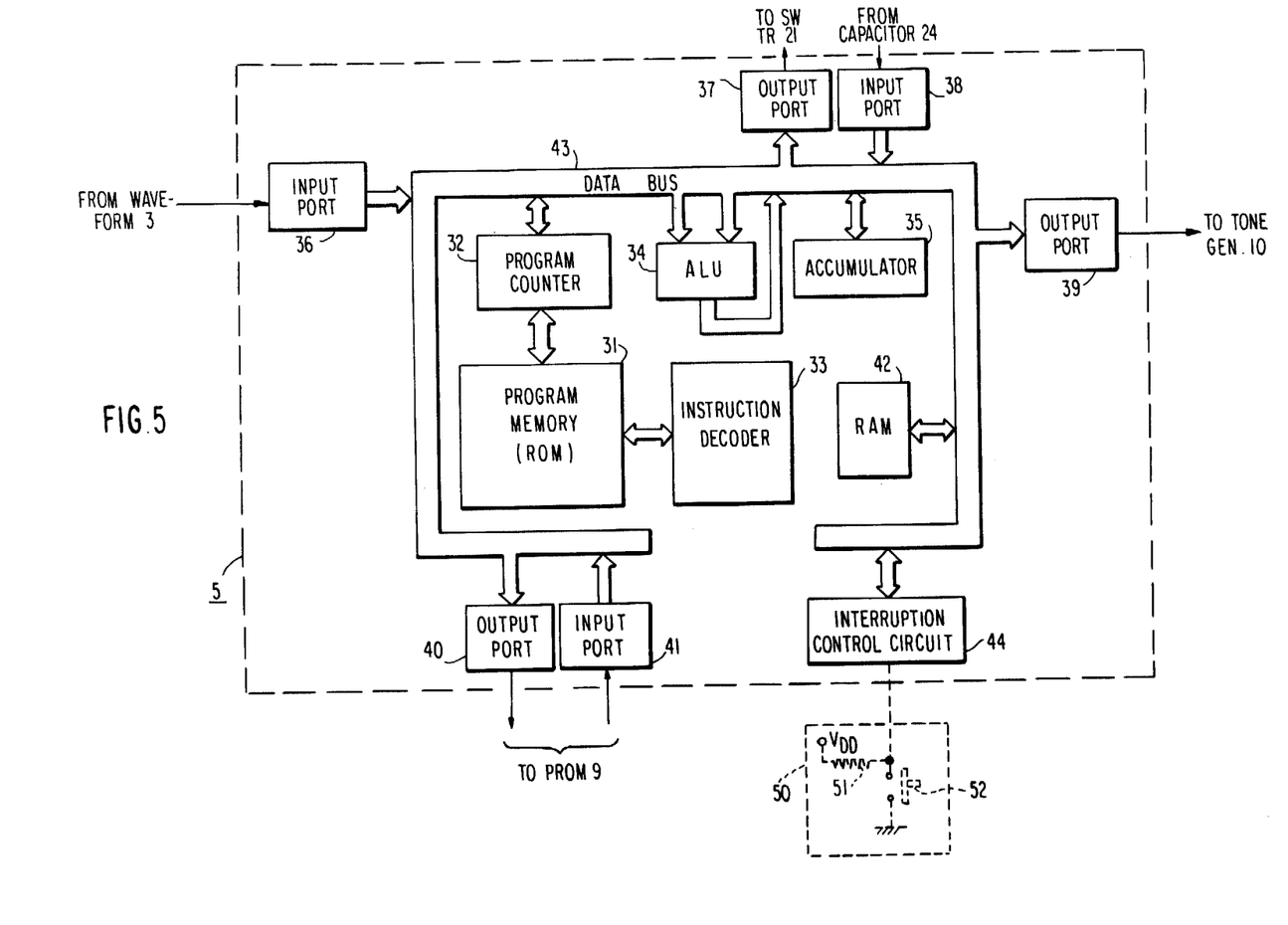
FIG. 5 is a schematic block diagram of an embodiment of the present invention, wherein the decoder section of the receiver illustrated in FIG. 1 is made of a single-chip CPU.

Referring to FIG. 5, a sequence of instructions to be executed; is stored in a program memory 31 from which contents at an address designated by a program counter 32 are delivered to an instruction decoder 33. The instruction decoder decodes the instructions so delivered to supply corresponding control signals to various sections in the decoder 5. The program counter 32 is usually set to "+1" after an instruction is delivered from the program memory 31 to the instruction decoder 33, but its count contents are altered by a branching command, a jumping command or the like, so that instructions according to these commands are successively executed.

An arithmetic-logic unit (ALU) 34 is a circuit for effecting various operations including arithmetic operations and logic operations; a random access memory (RAM) 42 is used for the storage of processed data; the standby or program counter or the program status during a subroutine or an interruption; and an accumulator 35 is employed for storing the results of operation by the ALU 34 of the data exchanged between the RAM 42 and ports 36 to 41. A data bus 43 is a signal line for the exchange of data between different sections. The ports 37, 39 and 40 are output ports for providing signals from the data bus 43 to circuits exterior to the decoder 5, and have a latching function. The ports 36, 38 and 41 are input ports for delivering signals from circuits exterior to the decoder 5 to the data bus 43. An interruption control circuit 44 has a function to deliver internal interruption signals to the data bus 43.

The operation of the circuit illustrated in FIG. 5 will be described with reference to FIGS. 4A to 4F. When a battery saving control signal is supplied from the output port 37 in the stroke shown in FIG. 4B, the decoder 5 waits for the reception of the preamble signal P. When a paging signal of FIG. 4A is provided through the input port 36, the decoder 5 will be judging with its ALU 34 whether or not the paging signal is a preamble signal. Upon reception of the preamble signal, the output port 37 is kept in the "L" state so that power is continuously supplied to the receiver for a first predetermined period of time (about 20 sec in this embodiment). This first time period is necessary and sufficient for receiving the call signal which is to come in following the preamble signal P. With the ALU 34, the received call signal is compared with the receiver's identification number signal stored in the PROM 9 which is addressed through the output port 40 and provides its contents through the input port 41. At the same time, the received call signal is also compared with a specified digital-pattern signal for test which relieves the battery saving function and, with an end-mark signal, both are written into the RAM 42.

Thus, if the specified digital-pattern signal SP (FIG. 4A) for test is detected within the first predetermined time period, no return to the battery saving operation will take place even after the lapse of the first predetermined time period. It will only take place after the lapse of a second predetermined time period (about 5 minutes in this embodiment) started by the detection of the specified digital-pattern for test. Thus, after the lapse of five minutes, a control signal from the interruption control circuit 44 restores the battery saving function.

If desired address signal (D) is detected within the first predetermined time period, the decoder 5 will drive the alert tone generating circuit 10 via the output port 39 to sound the speaker 11 to let the receiver holder know that he or she is being paged. Then the detection of the end-mark signal E will restore the battery saving function. Obviously, the use of a switch is also conceivable to return the receiver, which is kept receiving continuous power supply by the detection of the specified digital-pattern for test, to the battery saving operation. The switch for this purpose can primarily comprise, as shown by broken block 50 in FIG. 5, a resistor 51 and a push switch 52 which are coupled to the interruption control circuit 44.

Figure 6:
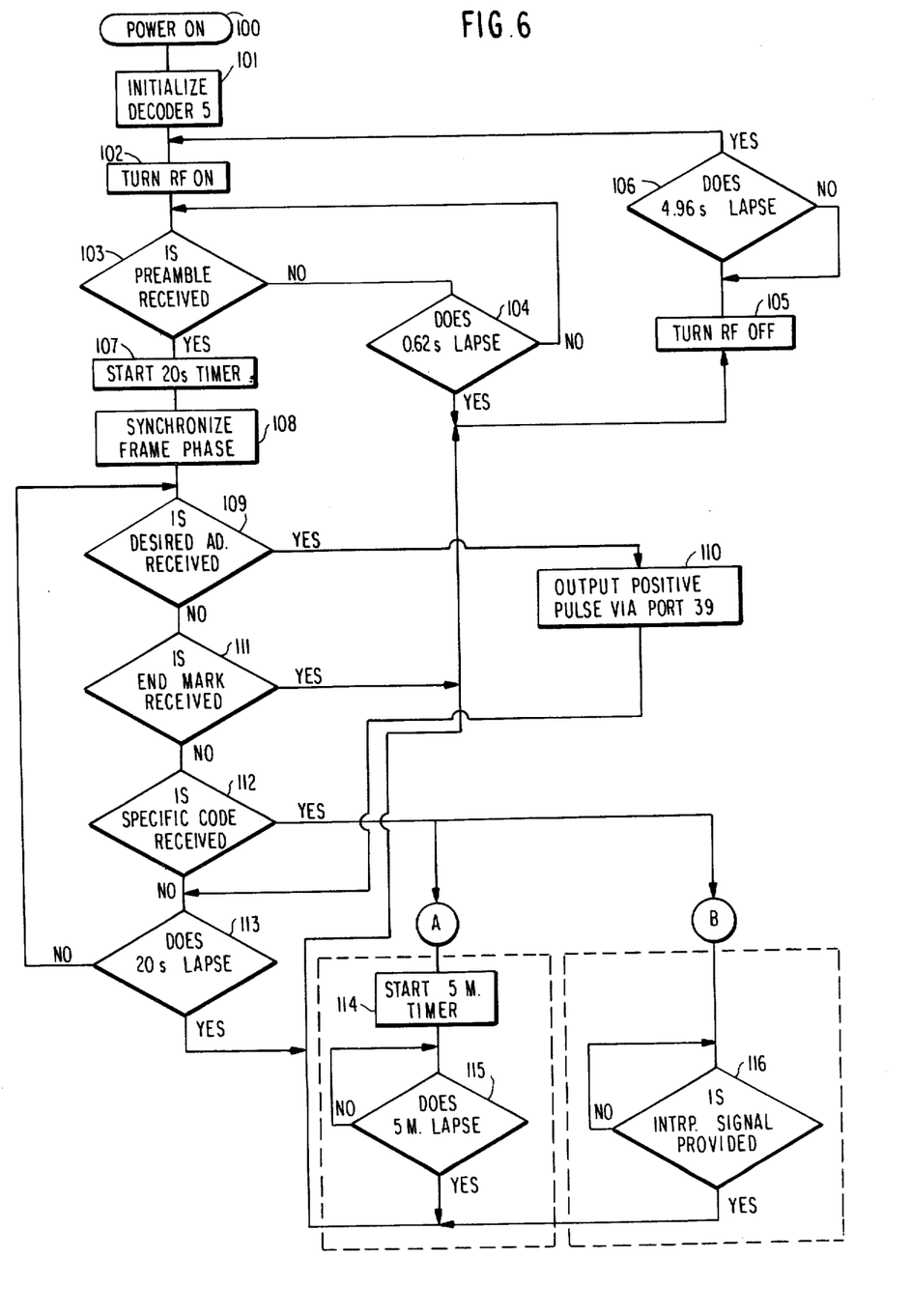
FIG. 6 is a flow chart showing the operation of the decoder section illustrated in FIG. 5.

The operation of the single-chip CPU hitherto described can be represented by the flow chart of FIG. 6. First, when the power supply of the receiver is turned on at Step 100, the CPU is initialized at Step 101. At the same time, the normal mode battery saving operation is started, and as long as power is supplied to the receiver section at Step 102, the preamble signal is sought (Step 103). If 0.62 seconds have lapsed without the preamble signal being detected, as shown at Steps 104 to 106, power supply to the receiver section and the waveform shaping circuit is interrupted and, after the lapse of another time period of 4.96 seconds, a return to Step 102 takes place to restore power supply.

Meanwhile, if the detection of the preamble signal is confirmed while power is being supplied, the process shifts to Step 107 and further to Step 108 to acutate the 20-sec timer and to synchronize the frame phase in preparation for the detection of the desired address signal and the end-mark signal or the specified digital-signal, which follows the preamble signal. Upon reception of the desired address signal at Step 109, the process moves to Step 110 to give a positive pulse via the output port 39 to the alert tone generating circuit 10 to activate it. As a result of this activation, the holder of the receiver can hear an alert tone from the speaker 11. If, after the detection of the desired address signal, either the 20-sec timer counts out or the end-mark signal is detected, power supply is interrupted for a return to the battery saving operation (See Steps 111 and 113).

If, at Step 113, the specified digital-signal for suspending the battery saving function is detected before the 20-sec timer counts out, the process shifts from Step 112 to a test mode of either Route A or Route B. If Route A is taken a 5-min timer is started at Step 114, and power is continuously supplied until this timer counts out. If, on the other hand, Route B is followed, power is continuously supplied until a control signal is provided from the external switch 50 shown in FIG. 5 (Step 116). After the execution of Step 115 or 116, the receiver will resume its normal battery saving operation.

As hitherto described, according to the present invention, the paging receiver is supplied with a specified digital-pattern signal for test as required and with a circuit to detect this specified digital-pattern signal. With detection of the specified digital-pattern signal, the receiver of the present invention makes it possible to automatically suspend the battery saving function. Therefore, if the receiver is mounted in a case or the like, there is no need to remove it from the case and connect or disconnect its strap or the like every time its electrical characteristics or the like are to be tested. It is easily understood from the foregoing that the feature of the present invention can be also adapted to a paging receiver capable of receiving a tone signal and a specified tone-pattern signal.

What is claimed is:
1. A radio paging receiver comprising:
a receiver section for receiving a preamble signal, a specified signal for test, and a call signal including an address signal;
means for storing in advance an identification number assigned to said radio paging receiver;
means for detecting said preamble signal from the output of said receiver section to provide a preamble detection signal;
signal detecting means for comparing said address signal supplied from said receiver section and an output read out of said storing means and, upon detection of their coincidence, supplying an identity signal;
means for generating an alert signal in response to said identity signal;
battery saving means for, when activated, supplying power from a battery to said receiver section either intermittently in a prescribed cycle so that said receiver section can receive at least said preamble signal or for a prescribed period of time so that said receiver section can receive said address signal in response to said preamble detection signal, said battery saving means when deactivated permitting continuous supply of power to said receiver section;
specified signal detecting means for detecting said specified signal from the output of said receiver section and supplying a signal to suspend battery saving; and
battery saving suspending means for deactivating said battery saving means in response to said signal to suspend battery saving, thereby placing the receiver in condition for test operation.
2. A radio paging receiver as claimed in claim 1, wherein said signal detecting means, battery saving means, specified signal detecting means and battery saving suspending means are incorporated into a single-chip integrated circuit.

3. A radio paging receiver as claimed in claim 1, wherein said call signal further contains an end-mark signal after address signal, and said receiver further comprises: means for detecting said end-mark signal from the output of said receiver section and for terminating said preamble detection signal in response to detection of said end-mark signal.

4. A radio paging receiver as claimed in claim 1 or 3 wherein said battery saving suspending means has a first state for deactivating said battery saving means and a second state in which it does not deactivate said battery saving means and switches from said second state to said first state in response to said signal to suspend battery saving, said receiver further comprising means connected to said battery for presetting said battery saving suspending means to said second state.

5. A radio paging receiver as claimed in claim 3, wherein said call signal and said specified signal are digital signals.

6. A radio paging receiver as claimed in claim 5 further comprising synchronization means responsive to said preamble signal supplied from said receiver section for supplying synchronization pulses to said signal detecting means, specified signal detecting means and end-mark detecting means.

7. A radio paging receiver as claimed in claim 3, wherein said signal detecting means, battery saving means, specified signal detecting means, battery saving suspending means and battery saving restoring means are incorporated into a single-chip integrated circuit.

8. A radio paging receiver as claimed in claim 1, wherein said battery saving means comprises switch means for providing power to said receiver section in accordance with a control signal and an intermittent signal source, and wherein said battery saving suspending means comprises logic means for logically combining said intermittent signal, said preamble detection signal and a signal corresponding to said signal to suspend battery saving.

9. A radio paging receiver as claimed in claim 1, wherein said call signal and said specified signal are digital signals.

* * * * *

UNITED STATES PATENT AND TRADEMARK OFFICE
CERTIFICATE OF CORRECTION

PATENT NO. : 4,479,125

DATED : October 23, 1984

INVENTOR(S) : Toshihiro MORI, Tokyo, Japan

It is certified that error appears in the above-identified patent and that said Letters Patent is hereby corrected as shown below:

Column 3, line 24, "2B" should be --3B--;

line 42, "(FIG. 3A)" should be --(not shown)--.

Column 4, line 50, after "counter", delete "or" and insert --is used to indicate--;

line 52, "operation" should be --operations--.

Signed and Sealed this

Twenty-first Day of May 1985

[SEAL]

Attest:

DONALD J. QUIGG

Attesting Officer     Acting Commissioner of Patents and Trademarks